United States Patent
Gleiter et al.

(10) Patent No.: US 9,577,444 B2
(45) Date of Patent: Feb. 21, 2017

(54) METHOD FOR STATE OF CHARGE COMPENSATION OF A BATTERY AND METHOD FOR CHARGING A BATTERY

(71) Applicants: Robert Bosch GmbH, Stuttgart (DE); Samsung SDI Co., Ltd., Yongin-si, Gyeonggi-do (KR)

(72) Inventors: Andreas Gleiter, Stuttgart (DE); Joerg Christoph Wilhelm, Stuttgart (DE); Christian Korn, Stuttgart (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 209 days.

(21) Appl. No.: 14/489,872

(22) Filed: Sep. 18, 2014

(65) Prior Publication Data
US 2015/0084595 A1 Mar. 26, 2015

(30) Foreign Application Priority Data
Sep. 23, 2013 (DE) .................. 10 2013 219 082

(51) Int. Cl.
*H02J 7/00* (2006.01)

(52) U.S. Cl.
CPC .......... *H02J 7/0021* (2013.01); *Y02T 10/7055* (2013.01)

(58) Field of Classification Search
CPC ... H02J 7/0021; H02J 7/1446; Y02T 10/7055; B60L 11/1861
USPC ........................................ 320/127
See application file for complete search history.

(56) References Cited

U.S. PATENT DOCUMENTS

| | | | | |
|---|---|---|---|---|
| 4,455,523 A * | 6/1984 | Koenck | ........... | G06F 1/263 320/112 |
| 4,829,225 A * | 5/1989 | Podrazhansky | ....... | H02J 7/0093 320/129 |
| 5,471,129 A * | 11/1995 | Mann | ........... | A61C 19/004 320/115 |
| 7,217,473 B2 * | 5/2007 | Ovshinsky | ........... | H01M 2/1077 429/120 |
| 8,886,478 B2 * | 11/2014 | Fink | ........... | H02J 7/1446 320/125 |

(Continued)

FOREIGN PATENT DOCUMENTS

DE  10 2008 002 190 A1  12/2009
DE  10 2009 002 466 A1  10/2010

*Primary Examiner* — M'Baye Diao
(74) *Attorney, Agent, or Firm* — Maginot, Moore & Beck LLP

(57) ABSTRACT

The disclosure relates to a method for state of charge compensation of a battery having a plurality of battery units. The method comprises the steps of calculating a depth of discharge of each battery unit after the battery units have been charged, calculating an available charge of each battery unit before the battery units are charged, calculating a state of charge compensation requirement value on the basis of the calculated depth of discharge and the calculated available charge for each battery unit, and discharging each battery unit on the basis of the calculated state of charge compensation requirement value. The disclosure also relates to a method for charging a battery which has a plurality of battery units. Also specified are a computer program and a battery management system set up to perform the method, and a battery and a motor vehicle having a drive system connected to such a battery.

8 Claims, 3 Drawing Sheets

(56) References Cited

U.S. PATENT DOCUMENTS

2005/0058892 A1\* 3/2005 Ovshinsky .......... H01M 2/1077
429/120
2013/0022843 A1\* 1/2013 Tohda ................... H01M 4/587
429/50

\* cited by examiner

METHOD FOR STATE OF CHARGE COMPENSATION OF A BATTERY AND METHOD FOR CHARGING A BATTERY

This application claims priority under 35 U.S.C. §119 to application no. DE 10 2013 219 082.4, filed on Sep. 23, 2013 in Germany, the disclosure of which is incorporated herein by reference in its entirety.

BACKGROUND

The disclosure relates to a method for state of charge compensation of a battery which has a plurality of battery units.

The disclosure also relates to a method for charging a battery which has a plurality of battery units.

The disclosure also relates to a computer program and a battery management system, which are set up to perform the method, and to a battery and a motor vehicle, the drive system of which motor vehicle is connected to such a battery.

It is known that individual states of charge (SOC) of battery units in a battery pack can drift apart from one another. A method for state of charge compensation of vehicle batteries is known, for example, from DE 10 2008 002 190 A1, wherein the state of charge compensation is performed during the driving operation by, firstly, the state of charge of individual cells being calculated and then, for at least two of said cells, an amount of charge which the cells should discharge being determined. The cells are discharged according to the calculated amount of charge.

A so-called resistive balancing method is also described in DE 10 2009 002 466 A1. In that document, so-called inductive cell balancing is also described as an alternative, wherein the circuit concept for compensation of the cell voltages involves inductive intermediate storage of the electrical energy transported in that case.

The reasons for the states of charge of the battery units drifting apart from one another are, for example, different self-discharge rates of the battery units, different charging efficiencies or different capacities. These effects need not be coupled to one another. It is therefore possible that a battery unit has a high self-discharge during operation, that is to say during discharging, but also has a high charging efficiency during charging, that is to say can take on more charge of the charge current as usable charge than other cells. In this case, the two effects partially compensate for one another by themselves. Present state of charge compensation methods do not take these effects into account and must therefore compensate more charge than necessary.

SUMMARY

A method according to the disclosure for state of charge compensation of a battery which has a plurality of battery units comprises the following steps:
a) calculating a depth of discharge of each battery unit after the battery units have been charged,
b) calculating an available charge of each battery unit before the battery units are charged,
c) calculating a state of charge compensation requirement value on the basis of the calculated depth of discharge and the calculated available charge for each battery unit, and
d) discharging each battery unit on the basis of the calculated state of charge compensation requirement value.

Step a) takes place after charging, preferably after complete charging of the battery units, that is to say when the battery pack is charged. Between step a) and step b), the battery units are partially discharged or fully discharged. Step b) preferably takes place directly before recharging.

The instant after charging has taken place is denoted in the formulae below by the index 1 and the instant before the charging which is to take place is denoted by the index 2.

Different self-discharge rates of the battery units and different charging efficiencies are taken into account in calculating the state of charge compensation requirement value. Charging efficiency is denoted the portion of usable charge relative to the portion of charge which flowed as charge current.

By means of the measures of the disclosure, in total no charge is compensated unnecessarily, rather only the net requirement is balanced over all effects which lead to different individual states of charge of the battery units. In particular, this has the advantage that the components of the state of charge compensation electronics do not unnecessarily heat up and age more quickly. The temperature travel in the case of the state of charge compensation can typically be approximately 40 K. In addition, quicker aging of the solder connections, which is brought about by the temperature change caused by the state of charge compensation, is avoided.

The control loop which involves the comparison of the state of charge after charging to the state of charge before charging is moreover designed in an adaptive manner and can adapt itself to changes in capacities, self-discharge rates and charging efficiencies of the battery units possibly caused by aging.

According to a preferred embodiment, in step a), the depth of discharge is calculated by the steps of:
a1) calculating a state of charge of each battery unit,
a2) calculating a battery unit with maximum state of charge, and
a3) calculating a first charge difference value of each battery unit with respect to the battery unit with maximum state of charge.

A model of the battery unit is generally taken as a basis in order to calculate the state of charge (SOC) of the battery unit. An example of a model such as this is illustrated in FIG. 1. Particularly preferably, in step a1), the state of charge is calculated on the basis of a charge current and an open terminal voltage (OCV, open circuit voltage) of the battery. This can take place, for example, by calculating a charge current integral, in particular by a computer-aided method.

The maximum state of charge calculated in step a2) is also denoted by $$\max_i(Q_{1,i}),$$

wherein the calculation of the first charge difference value according to step a3) can be represented as $$\Delta Q_{1,i} = \max_i(Q_{1,i}) - Q_{1,i}.$$

According to a preferred embodiment, in step b) of the method, the charge which is still available is calculated by the steps of:
b1) calculating a state of charge of each battery unit,
b2) calculating a battery unit with minimum state of charge, and
b3) calculating a second charge difference value of each battery unit with respect to the battery unit with minimum state of charge.

Particularly preferably, in step b1), the state of charge is calculated on the basis of the calculation of a charge current and an open terminal voltage of the battery unit. In particular, a discharge current integral can be computed, for example, in a computer-controlled manner, with the result that the charge which is still available in each battery unit can be calculated on the basis of a suitable model, for example on the basis of the model from FIG. 1.

The minimum state of charge calculated in step b2) is also denoted in the context of the disclosure as $$\min_i(Q_{2,i}),$$

with the result that the calculation of the second charge difference value of each battery unit with respect to the battery unit with minimum state of charge according to step b3) can be represented as $$\Delta Q_{2,i} = Q_{2,i} - \min_i(Q_{2,i}).$$

The calculation of the state of charge compensation requirement value on the basis of the calculated depth of discharge and the calculated available charge for each battery unit according to step c) can be represented, according to a preferred embodiment, as $$\Delta Q_i = \Delta Q_{2,i} - \Delta Q_{1,i}.$$

Particularly preferably, $\Delta Q_i$ is always set $\geq$, since, in the case of typical state of charge compensation methods, for instance resistive balancing or inductive balancing, only charge can be taken from a battery unit. This can be represented as $$\Delta Q_i = \max(\Delta Q_{2,i} - \Delta Q_{1,i}, 0).$$

According to another aspect of the disclosure, a method for charging a battery which has a plurality of battery units comprises, in a first step, one of the methods for state of charge compensation of the battery described in the context of the present disclosure and, in a second step, charging the battery units.

Advantageously, the state of charge compensation is established before charging, with the result that the battery units have the same amount of usable charge after charging. In this way, it is achieved that the amount of charge imbalance which will occur through the charging itself owing to different charging efficiencies of the battery units, is already taken into account in the state of charge compensation before charging. The method for charging the battery thus comprises a control loop which feeds back the targeted state of charge compensation result to the prediction in the case of the next state of charge compensation, with the result that the sum of compensated charge remains as small as possible. By means of the state of charge compensation before the battery is charged, the system can be brought into the state of maximum available charge after charging.

According to a preferred embodiment, in the second step of the method for charging the battery, the charging of all of the battery units is limited by the minimum of an effective depth of discharge (effective DOD) of the battery units. The effective depth of discharge of each of the battery units is calculated in this case on the basis of a charging efficiency and a depth of discharge (DOD).

According to the disclosure, a computer program is also proposed, according to which one of the methods described in this document is performed when the computer program is executed on a programmable computer device. The computer program can be, in particular, a module for implementing a battery balancing system or a module for implementing a battery management system of a vehicle.

According to another aspect, a battery management system of a battery, which has a plurality of battery units, comprises a unit for calculating a depth of discharge of each battery unit after the battery units have been charged, a unit for calculating an available charge of each battery unit before the battery units are charged, a unit for calculating a state of charge compensation requirement value on the basis of the calculated depth of charge and the calculated available charge of each battery unit, and a unit for controlling the discharge of each battery unit on the basis of the calculated state of charge compensation requirement value.

A battery management system which additionally has a unit for controlling the charging behavior of the battery modules is particularly preferred.

According to the disclosure, a battery, in particular a lithium-ion battery or a nickel-metal hydride battery is additionally provided, which battery comprises a battery management system and is preferably connectable to a drive system of a motor vehicle, wherein the battery management system is designed and/or set up, as described above, to perform the method according to the disclosure.

The terms "battery" and "battery unit" are used in the present description for rechargeable battery and, respectively, rechargeable battery unit in a manner adapted from everyday language. The battery preferably comprises one or more battery units which can refer to a battery cell, a battery module, a module string or a battery pack. In this case, battery pack refers to a plurality of cells which are spatially combined and often provided with a housing or an encapsulation. The battery cells are in this case preferably fixedly connected to one another and connected to one another in terms of circuitry, for example interconnected in series or parallel to form modules. A plurality of modules can be interconnected to form so-called battery direct converters (BDC) and a plurality of battery direct converters can be interconnected to form a so-called battery direct inverter (BDI).

According to the disclosure, a motor vehicle having such a battery is also provided, wherein the battery is connected to a drive system of the motor vehicle. Preferably, the method is used in electrically driven vehicles in which a multiplicity of battery cells are interconnected to provide the required drive voltage of the vehicle.

BRIEF DESCRIPTION OF THE DRAWINGS

Exemplary embodiments of the disclosure are presented in the drawings and are explained in more detail in the description below.

In the drawings.

DETAILED DESCRIPTION

Figure 1A:
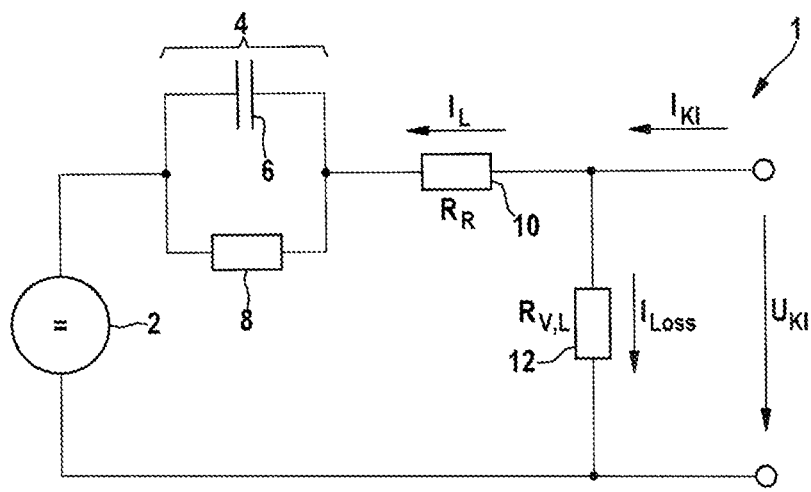
FIG. 1A and FIG. 1B show an exemplary equivalent circuit diagram of a battery unit.
Figure 1B:
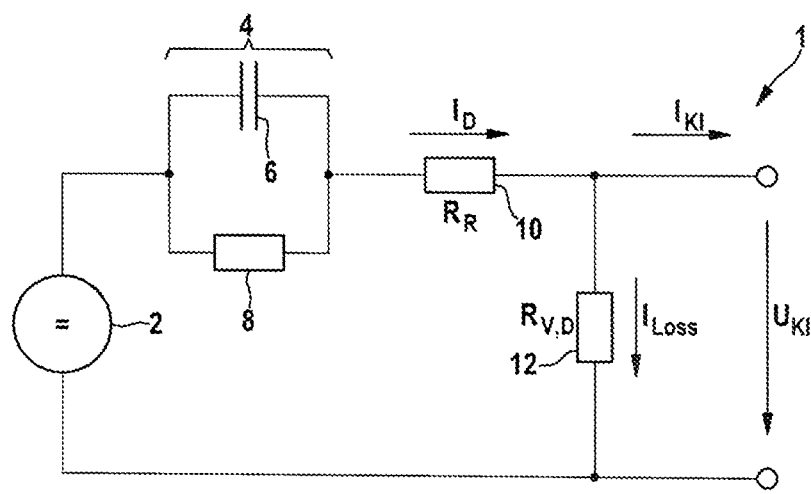

FIGS. 1A and 1B show an equivalent circuit diagram of a battery unit 1 according to a model, for example of a battery cell. An equivalent circuit diagram such as this is extensively described in the literature, for example in "Moderne Akkumulatoren richtig einsetzen" [Using modern rechargeable batteries correctly] by Jossen, Weydanz. The battery unit 1 comprises an ideal current source 2, an RC member 4 which is connected in series with the ideal current source and has a capacitor 6 and resistor 8 connected in parallel with one another, and a further resistor 10 which is connected in series with said RC member. In addition, the battery unit comprises a loss resistance 12 across which a terminal voltage $U_{Kl}$ is present. A terminal current $I_{Kl}$ separates into a charge current $I_L$ via the further resistor 10 and into a loss current $I_{Loss}$ via the loss resistance 12. The charging efficiency of the battery unit 1 can be represented in this model as $$\eta = \frac{I_L}{I_{Kl}} = 1 - \frac{I_{Loss}}{I_{Kl}}.$$

FIG. 1B illustrates the same battery unit 1, wherein in this case a discharge current $I_D$ is divided into a terminal current $I_{Kl}$ and a loss current $I_{Loss}$ via the loss resistance 12. Since the chemical loss mechanisms when charging and discharging need not be identical, the ohmic value of the loss resistance 12 can be different when charging and discharging in the model illustrated in FIG. 1A and FIG. 1B, that is to say Therefore, different charging/discharging efficiencies are possible.

$$R_{V,L} \neq R_{V,D}.$$

Therefore, different charging/discharging efficiencies are possible.

Figure 2A:
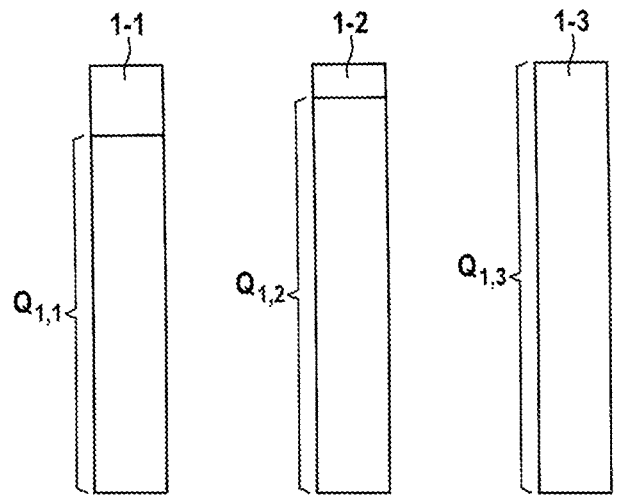
FIG. 2A and FIG. 2B show three battery units with states of charge after and before charging.
Figure 2B:
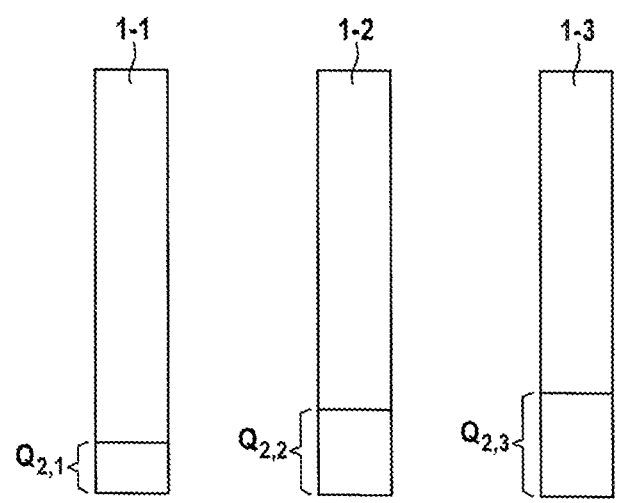

FIG. 2 shows three battery units 1-1, 1-2, 1-3 with different states of charge after charging (FIG. 2A) and before charging (FIG. 2B).

The state of charge of the ith battery unit 1-$i$ after charging is denoted by $Q_{1,i}$. The battery with the most charge is the third battery unit 1-3. The following emerges for the situation after charging illustrated in FIG. 2A:

$$\max_i(Q_{1,i}) = Q_{1,3}$$

$$\Delta Q_{1,1} = Q_{1,3} - Q_{1,1}$$

$$\Delta Q_{1,2} = Q_{1,3} - Q_{1,2}$$

$$\Delta Q_{1,3} = Q_{1,3} - Q_{1,3} = 0.$$

FIG. 2B illustrates the situation of the three battery units 1-1, 1-2, 1-3 before charging. The battery unit with the least charge is the first battery unit 1-1. Therefore, for the illustrated situation, the following emerges:

$$\min_i(Q_{2,i}) = Q_{2,1}$$

$$\Delta Q_{2,1} = Q_{2,1} - Q_{2,1} = 0$$

$$\Delta Q_{2,2} = Q_{2,2} - Q_{2,1}$$

$$\Delta Q_{2,3} = Q_{2,3} - Q_{2,1}.$$

Figure 3:
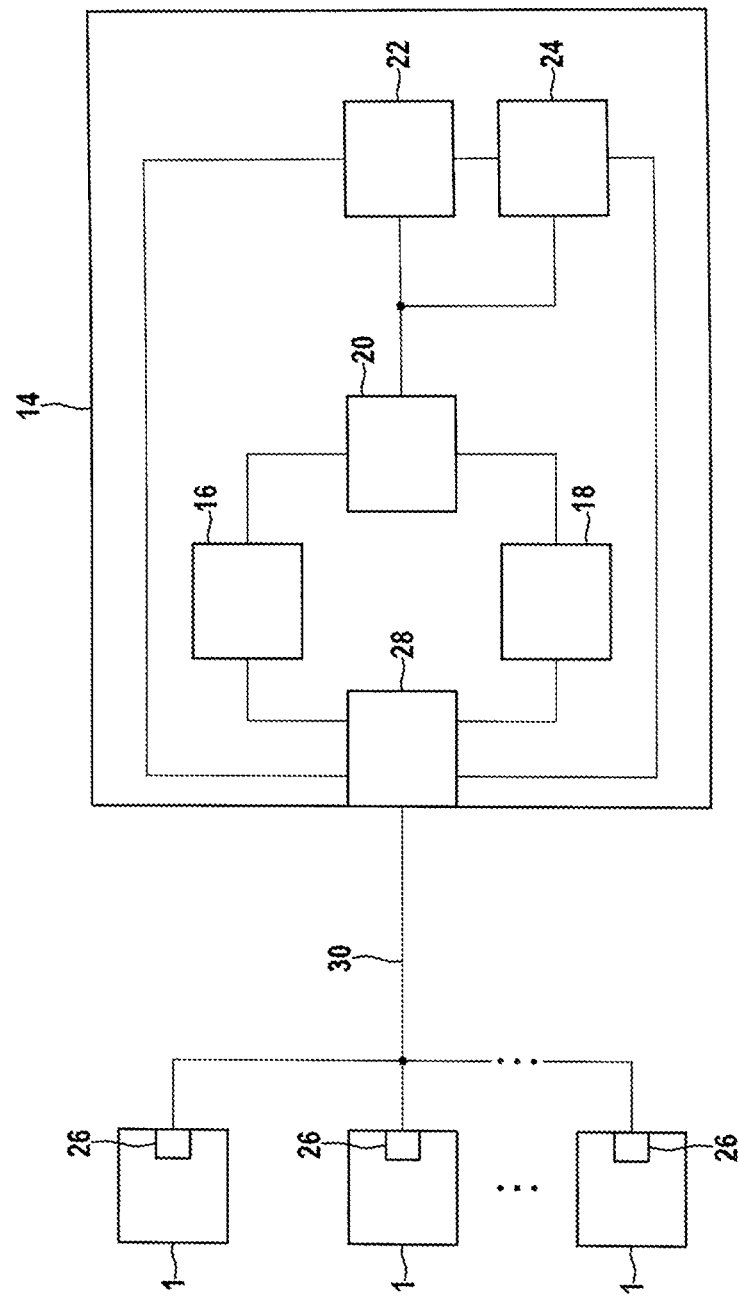
FIG. 3 shows a schematic illustration of a battery management system.

FIG. 3 shows a battery management system 14 according to the disclosure, which is set up to monitor and control a number of battery units 1. The communication between the battery management system 14 and the battery units 1 takes place via suitable communication units 26, 28 as interfaces to a communication channel 30, for example to a CAN bus. The battery management system 14 can alternatively be directly connected by measurement line to the battery units 1, with the result that no communication via a bus is necessary.

The battery management system 14 has a unit 16 for calculating a depth of discharge of the battery units 1. The unit 16 for calculating the depth of discharge of the battery units 1 is also set up to determine the instant at which the battery units are charged. After the charging, the unit 16 calculates the depth of discharge of the battery units 1, for example by calculating the present state of charge of each battery unit, by calculating the battery unit with maximum state of charge and by calculating the first charge difference value of each battery unit with respect to the battery unit with maximum state of charge, as described with reference to FIG. 2A.

The battery management system 14 additionally has a unit 18 for calculating the available charge of each battery unit before the battery units are charged. The unit 18 is set up to determine the instant at which the batteries are to be charged. By way of example, for this purpose it can be provided that the unit 18 evaluates information about a low state of charge of the battery and/or about a critical state of charge of the battery on a suitable communication channel, for instance a CAN bus, and, for example in the course of signaling the low or critical state of charge to the driver of the vehicle, calculates the available charge of each battery unit. Furthermore, it is possible that the battery management system 14 also identifies, through the connection of a charger, that the system is to be charged. Subsequently, it can perform the calculations. The computation steps b1)-b3) described herein can be permanently performed, however not during charging, and are stored, for example, in a circular buffer, wherein the circular buffer has length 1. If charging is identified, then the last stored value is no longer overwritten and is used for the evaluation. The calculation of the charge which is still available is performed by the unit 18, for example, by calculating the state of charge of each battery unit, by calculating the battery unit with minimum state of charge and by calculating the second charge difference value of each battery unit with respect to the battery unit with minimum state of charge, as is described with reference to FIG. 2B.

The battery management system 14 additionally has a unit 20 for calculating a state of charge compensation requirement value, which receives and processes data from the unit 18 for calculating the available charge and data from the unit 16 for calculating the depth of discharge of each battery unit. The unit 20 for calculating the state of charge compensation requirement value can calculate the state of charge compensation requirement value, for example, by difference formation of the available charge of each battery unit and the depth of discharge of each battery unit, wherein the value calculated herefrom is set to zero if it is negative.

The battery management system 14 additionally has a unit 22 for controlling the discharging of the battery units on the basis of the calculated state of charge compensation requirement value, which unit for controlling the discharging of the battery units receives the state of charge compensation requirement value from the unit 20. The battery management system 14 also has a unit 24 for controlling the charging of the battery units on the basis of the calculated state of charge compensation requirement value, which unit for controlling the charging of the battery units receives the state of charge compensation requirement value from the unit 20. In this exemplary embodiment, the unit 22 for controlling the discharging of each battery unit is coupled to the unit 24 which is set up to control the charging of the battery units. The unit 22 for controlling the discharging of the battery units and the unit 24 for controlling the charging of the battery units are connected to the communication unit 28 to the battery units 1.

The method will be explained by way of example on three cells with different self-discharge rates and with different charging efficiencies but identical capacities. The specification for the three cells is as follows:

| Cell | 1 | 2 | 3 |
|---|---|---|---|
| Self-discharge rate [A] | 0 | 0.01 | 0.02 |
| Charging efficiency [100%] | 0.9 | 0.95 | 1 |
| Capacity [Ah] | 10 | 10 | 10 |

Four discharge/charge processes are illustrated in the following table:

| Action | Observable | Cell 1 | Cell 2 | Cell 3 | Delta cell discharge [Ah] | Total balancing charge [Ah] |
|---|---|---|---|---|---|---|
| Start | cell charge $Q_{1,i}$ [Ah] | 10 | 10 | 10 | 0 | |
| | $\Delta Q_{1,i}$ [Ah] | 0.00 | 0.00 | 0.00 | | |
| 1 h discharge by 7 A | cell discharge [Ah] | 7.00 | 7.01 | 7.02 | | |
| | cell charge ($Q_{2,i}$) [Ah] | 3.00 | 2.99 | 2.98 | | |
| | charge difference at $\min_i(Q_{2,i})$ [Ah] | 0.02 | 0.01 | 0.00 | | |
| | balancing charge $\Delta Q_i$ [Ah] | 0.02 | 0.01 | 0.00 | | 0.03 |
| Balancing | cell charge after balancing [Ah] | 2.98 | 2.98 | 2.98 | | |
| | DOD [Ah] | 7.02 | 7.02 | 7.02 | | |
| | eff. DOD [Ah] | 7.80 | 7.39 | 7.02 | | |
| Charge*) | cell charge [Ah] | 9.30 | 9.65 | 10.00 | 0.70 | |
| | DOD [Ah] | 0.70 | 0.35 | 0.00 | | |
| 1 h discharge by 7 A | cell discharge [Ah] | 7.00 | 7.01 | 7.02 | | |
| | cell charge ($Q_{2,i}$) [Ah] | 2.30 | 2.64 | 2.98 | | |
| | charge difference at $\min_i(Q_{2,i})$ [Ah] | 0.00 | 0.34 | 0.68 | | |
| | balancing charge $\Delta Q_i$ [Ah] | 0.00 | 0.00 | 0.68 | | 0.68 |
| Balancing | cell charge after balancing [Ah] | 2.30 | 2.64 | 2.30 | | |
| | DOD [Ah] | 7.70 | 7.36 | 7.70 | | |
| | eff. DOD [Ah] | 8.56 | 7.74 | 7.70 | | |
| Charge*) | cell charge [Ah] | 9.23 | 9.96 | 10.00 | 0.77 | |
| | DOD [Ah] | 0.77 | 0.04 | 0.00 | | |
| 1 h discharge by 7 A | cell discharge [Ah] | 7.00 | 7.01 | 7.02 | | |
| | cell charge ($Q_{2,i}$) [Ah] | 2.23 | 2.96 | 2.98 | | |
| | charge difference at $\min_i(Q_{2,i})$ [Ah] | 0.00 | 0.73 | 0.75 | | |
| | balancing charge $\Delta Q_i$ [Ah] | 0.00 | 0.69 | 0.75 | | 1.44 |
| Balancing | cell charge after balancing [Ah] | 2.23 | 2.27 | 2.23 | | |
| | DOD [Ah] | 7.77 | 7.73 | 7.77 | | |
| | eff. DOD [Ah] | 8.63 | 8.14 | 7.77 | | |
| Charge*) | cell charge [Ah] | 9.22 | 9.65 | 10.00 | 0.78 | |
| | DOD [Ah] | 0.78 | 0.35 | 0.00 | | |
| 1 h discharge by 7 A | cell discharge [Ah] | 7.00 | 7.01 | 7.02 | | |
| | cell charge ($Q_{2,i}$) [Ah] | 2.22 | 2.65 | 2.98 | | |
| | charge difference at $\min_i(Q_{2,i})$ [Ah] | 0.00 | 0.42 | 0.76 | | |
| | balancing charge $\Delta Q_i$ [Ah] | 0.00 | 0.07 | 0.76 | | 0.85 |
| Balancing | cell charge after balancing [Ah] | 2.22 | 2.57 | 2.22 | | |
| | DOD [Ah] | 7.78 | 7.43 | 7.78 | | |
| | eff. DOD [Ah] | 8.64 | 7.82 | 7.78 | | |
| Charge*) | cell charge [Ah] | 9.22 | 9.96 | 10.00 | 0.78 | |

*)the charge provided per cell is the minimum of the effective DOD (eff. DOD).

At the beginning (Start), all three cells are charged to 10 Ah. An hour of discharging by 7 A follows, wherein, owing to the self-discharge, different cell charges occur at cell 1, cell 2 and cell 3, namely 3 Ah at cell 1, 2.99 Ah at cell 2 and 2.98 Ah at cell 3. According to the disclosure, this state is to be determined before the cells are to be charged, for example, at this instant a signal of the critical battery state is output to the driver, whereupon the cells are charged. Before the charging, a charge compensation is performed. For this purpose, first the cell with the minimum charge is determined, which in this case is the cell 3 with 2.98 Ah, and a value $\Delta Q_{2,i}$, which is referred to as second charge difference value within the scope of the disclosure, is calculated for each cell as the difference of the cell charge from the minimum cell charge. For the first cell, a charge difference of 0.02 Ah results, for the second cell, a charge difference of 0.01 Ah results and no charge difference results for the third cell. In the next step, the state of charge compensation requirement value is calculated, which in this case, in which the cell charge for all the cells was identical at the beginning, is the same as the second charge difference value. Each cell is now discharged on the basis of the calculated state of charge compensation requirement value, with the result that the same cell charge of 2.98 results for each cell after balancing.

In the next step, a depth of discharge of the cells is calculated, which results in 7.02 Ah for all three cells. Since the three cells have different charging efficiencies, however, namely cell 3 has a 100% charge efficiency, cell 2 has a 95% charge efficiency and cell 1 has a 90% charge efficiency, an effective depth of discharge (DOD) of 7.80 results for cell 1, of 7.39 for cell 2 and of 7.02 for cell 3. In order to avoid overcharging, the three cells are then provided with the minimum of the effective depth of discharge during charging, in this case 7.02 Ah. After the cells have been charged, only the third cell is still charged to 10 Ah. After charging, according to step a) of the method according to the disclosure, the depth of discharge of each battery unit is calculated, which results in 0.7 Ah for the first cell, 0.35 Ah for the second cell and 0 Ah for the third cell.

In a second cycle, a one-hour discharge by 7 A is again undertaken, which, owing to the different charge in the cells after charging and the different self-discharge rates, leads to a cell charge of 2.3 Ah in the case of cell 1, to 2.64 Ah in the case of cell 2 and to 2.98 Ah in the case of cell 3. Cell 1 is now the minimally charged cell. Cell 2 has a charge difference of 0.34 Ah and cell 3 has a charge difference of 0.68 Ah. Since the state of charge compensation requirement values result from the difference of the previously calculated depth of discharge and the available charge for each battery unit, in this configuration, it occurs that neither cell 1 nor cell 2 are discharged. In the case of cell 2, the resulting state of charge compensation requirement value $\Delta Q_2 = 0.34$ Ah$-0.35$ Ah$=-0.01$ Ah. Since it is only possible to discharge, and not to charge, the state of charge compensation requirement value is set to precisely zero. Only cell 3 is therefore discharged by 0.68 Ah. After the battery units have been discharged on the basis of the calculated state of charge compensation requirement values, the result is that the cells have different cell charges: cell 2 has a charge of 2.64 Ah while cells 1 and 3 have a charge of 2.3 Ah. The charging of the cells by the minimum of the effective depth of discharge concludes the second charging cycle.

The sum of the state of charge compensation requirement values resulted in a total state of charge compensation requirement value of 0.35 Ah in the first cycle and of 0.68 Ah in the second cycle. In the third cycle, which again comprises an hour of discharging by 7 A, a total state of charge compensation requirement value of 1.44 Ah results. In the fourth cycle, which proceeds under the same conditions, a total state of charge compensation requirement value of 0.83 Ah results.

The following shows what happens when the state of charge compensation requirement value for the cells is calculated merely on the basis of the available charge for each battery unit, with the general framework as before. The general framework comprises four cycles with in each case an hour of discharging by 7 A, subsequent balancing and charging, wherein the charging is limited to the minimum of the effective depth of discharge.

| Action | Observable | Cell 1 | Cell 2 | Cell 3 | Delta cell discharge [Ah] | Total balancing charge [Ah] |
|---|---|---|---|---|---|---|
| Start | cell charge $Q_{1,i}$ [Ah] | 10.00 | 10.00 | 10.00 | 0 | |
| | $\Delta Q_{1,i}$ [Ah] | 0.00 | 0.00 | 0.00 | | |
| 1 h discharge by 7 A | cell discharge [Ah] | 7.00 | 7.01 | 7.02 | | |
| | cell charge ($Q_{2,i}$) [Ah] | 3.00 | 2.99 | 2.98 | | |
| | charge difference at $\min_i(Q_{2,i})$ [Ah] | 0.02 | 0.01 | 0.00 | | |
| | balancing charge $\Delta Q_i$ [Ah] | 0.02 | 0.01 | 0.00 | | 0.03 |
| Balancing | cell charge after balancing [Ah] | 2.98 | 2.98 | 2.98 | | |
| | DOD [Ah] | 7.02 | 7.02 | 7.02 | | |
| | eff. DOD [Ah] | 7.80 | 7.39 | 7.02 | | |
| Charge*) | cell charge [Ah] | 9.30 | 9.65 | 10.00 | 0.7 | |
| | DOD [Ah] | 0.70 | 0.35 | 0.00 | | |
| 1 h discharge by 7 A | cell discharge [Ah] | 7.00 | 7.01 | 7.02 | | |
| | cell charge ($Q_{2,i}$) [Ah] | 2.30 | 2.64 | 2.98 | | |
| | charge difference at $\min_i(Q_{2,i})$ [Ah] | 0.00 | 0.35 | 0.68 | | |
| | balancing charge $\Delta Q_i$ [Ah] | 0.00 | 0.35 | 0.68 | | 1.03 |
| Balancing | cell charge after balancing [Ah] | 2.30 | 2.30 | 2.30 | | |
| | DOD [Ah] | 7.70 | 7.70 | 7.70 | | |
| | eff. DOD [Ah] | 8.56 | 8.11 | 7.70 | | |
| Charge*) | cell charge [Ah] | 9.23 | 9.61 | 10.00 | 0.77 | |
| | DOD [Ah] | 0.77 | 0.39 | 0.00 | | |

-continued

| Action | Observable | Cell 1 | Cell 2 | Cell 3 | Delta cell discharge [Ah] | Total balancing charge [Ah] |
|---|---|---|---|---|---|---|
| 1 h discharge by 7 A | cell discharge [Ah] | 7.00 | 7.01 | 7.02 | | |
| | cell charge ($Q_{2,i}$) [Ah] | 2.23 | 2.61 | 2.98 | | |
| | charge difference at $\min_i(Q_{2,i})$ [Ah] | 0.00 | 0.38 | 0.75 | | |
| | balancing charge $\Delta Q_i$ [Ah] | 0.00 | 0.38 | 0.75 | | 1.13 |
| Balancing | cell charge after balancing [Ah] | 2.23 | 2.23 | 2.23 | | |
| | DOD [Ah] | 7.77 | 7.77 | 7.77 | | |
| | eff. DOD [Ah] | 8.63 | 8.18 | 7.77 | | |
| Charge*) | cell charge [Ah] | 9.22 | 9.61 | 10.00 | 0.78 | |
| | DOD [Ah] | 0.78 | 0.39 | 0.00 | | |
| 1 h discharge by 7 A | cell discharge [Ah] | 7.00 | 7.01 | 7.02 | | |
| | cell charge ($Q_{2,i}$) [Ah] | 2.22 | 2.61 | 2.98 | | |
| | charge difference at $\min_i(Q_{2,i})$ [Ah] | 0.00 | 0.38 | 0.76 | | |
| | balancing charge $\Delta Q_i$ [Ah] | 0.00 | 0.38 | 0.76 | | 1.14 |
| Balancing | cell charge after balancing [Ah] | 2.22 | 2.22 | 2.22 | | |
| | DOD [Ah] | 7.78 | 7.78 | 7.78 | | |
| | eff. DOD [Ah] | 8.64 | 8.19 | 7.78 | | |
| Charge*) | cell charge [Ah] | 9.22 | 9.61 | 10.00 | 0.78 | |

*)the charge provided per cell is the minimum of the effective DOD (eff. DOD).

It can be seen that after each completed discharge of the battery units on the basis of the calculated state of charge compensation requirement values, the cells have a uniform charge; in the first cycle 2.98 Ah, in the second cycle 2.30 Ah, in the third cycle 2.23 Ah and in the fourth cycle 2.22 Ah.

In comparison, the two methods lead to different total state of charge compensation requirement values in all cycles other than the first. In the first cycle, in which the cells have a uniform cell charge, the total state of charge compensation requirement value is 0.03 Ah in both cases. After the second cycle, in the first case, a value of 0.68 Ah results and, in the second case, a value of 1.03 Ah results. After the third cycle, in the first case, a value of 1.44 Ah results and, in the second case, a value of 1.13 Ah results. After the fourth cycle, in the first case, a value of 0.83 Ah results and, in the second case, a value of 1.14 Ah results.

It is not the case that the values compensate state of charge compensation requirement values of the suggested methods over a plurality of cycles. Rather, in the third cycle, the value for the first method is higher than the value for the second method, however, the sum of the second and third cycle in the first method results in 2.12 Ah and in the second method it results in 2.16 Ah, which is different. In the fourth cycle, the value according to the first method is again below the value according to the second method.

The disclosure is not restricted to the exemplary embodiments described here and the aspects highlighted therein. On the contrary, a large number of modifications that are within the scope of action of a person skilled in the art are possible within the scope indicated by the claims.

What is claimed is:

1. A method for state of charge compensation of a battery having a plurality of battery units, the method comprising:
   calculating, with a depth of discharge unit operatively connected to each battery unit, a depth of discharge of each battery unit after the plurality of battery units has been charged;
   calculating, with an available charge unit operatively connected to each battery unit, an available charge of each battery unit before the plurality of battery units is charged;
   calculating, with a state of charge unit operatively connected to the depth of discharge unit and the available charge unit, a state of charge compensation requirement value based on the calculated depth of discharge and the calculated available charge of each battery unit; and
   discharging, with a discharge unit operatively connected to each battery unit, each battery unit based on the calculated state of charge compensation requirement value.

2. The method according to claim 1, the calculating of the depth of discharge with the depth of discharge unit further comprising:
   calculating a state of charge of each battery unit;
   calculating a battery unit with maximum state of charge; and
   calculating a charge difference value of each battery unit with respect to the battery unit with maximum state of charge.

3. The method according to claim 2, the calculating of the depth of discharge with the depth of discharge unit further comprising:

calculating a charge current of the battery;
calculating an open terminal voltage of the battery; and
calculating the state of charge of each battery unit based on the calculated charge current and the calculated open terminal voltage.

4. The method according to claim 1, the calculating of the state of charge with the available charge unit further comprising:
calculating a state of charge of each battery unit;
calculating a battery unit with minimum state of charge; and
calculating a charge difference value of each battery unit with respect to the battery unit with minimum state of charge.

5. The method according to claim 4, the calculating of the state of charge with the available charge unit further comprising:
calculating a charge current of the battery;
calculating an open terminal voltage of the battery; and
calculating the state of charge of each battery unit based on the calculated charge current and the calculated open terminal voltage.

6. A battery management system of a battery having a plurality of battery units, the battery management system comprising:
a depth of discharge unit configured to calculate a depth of discharge of each battery unit after the plurality of battery units has been charged;
an available charge unit configured to calculate an available charge of each battery unit before the plurality of battery units is charged;
a state of charge unit configured to calculate a state of charge compensation requirement value based on the calculated depth of charge and the calculated available charge of each battery unit; and
a discharge unit configured to discharge each battery unit based on the calculated state of charge compensation requirement value.

7. A battery having a plurality of battery units and a battery management system according to claim 6.

8. A motor vehicle comprising:
a drive system; and
a battery comprising:
a plurality of battery units; and
a battery management system comprising:
a depth of discharge unit configured to calculate a depth of discharge of each battery unit after the plurality of battery units has been charged;
an available charge unit configured to calculate an available charge of each battery unit before the plurality of battery units is charged;
a state of charge unit configured to calculate a state of charge compensation requirement value based on the calculated depth of charge and the calculated available charge of each battery unit; and
a discharge unit configured to discharge each battery unit based on the calculated state of charge compensation requirement value.

* * * * *